United States Patent
Geelhood et al.

(10) Patent No.: US 10,647,592 B2
(45) Date of Patent: May 12, 2020

(54) WATER FILTRATION SYSTEM

(71) Applicants: Samuel Geelhood, Beavercreek, OH (US); Clare Han, Beavercreek, OH (US); Joshua Kiduk Han, Beavercreek, OH (US); Joseph Allen Merkel, Centerville, OH (US); Teresa Marie Merkel, Centerville, OH (US); Marian Pope, Xenia, OH (US)

(72) Inventors: Samuel Geelhood, Beavercreek, OH (US); Clare Han, Beavercreek, OH (US); Joshua Kiduk Han, Beavercreek, OH (US); Joseph Allen Merkel, Centerville, OH (US); Teresa Marie Merkel, Centerville, OH (US); Marian Pope, Xenia, OH (US)

( * ) Notice: Subject to any disclaimer, the term of this patent is extended or adjusted under 35 U.S.C. 154(b) by 0 days.

(21) Appl. No.: 16/118,523

(22) Filed: Aug. 31, 2018

(65) Prior Publication Data

US 2020/0071189 A1     Mar. 5, 2020

(51) Int. Cl.
| | | |
|---|---|---|
| *C02F 1/00* | (2006.01) | |
| *C02F 1/28* | (2006.01) | |
| *B67D 3/00* | (2006.01) | |
| *C02F 101/12* | (2006.01) | |

(52) U.S. Cl.
CPC ............ *C02F 1/003* (2013.01); *B67D 3/0038* (2013.01); *C02F 1/283* (2013.01); *C02F 2101/12* (2013.01); *C02F 2307/10* (2013.01)

(58) Field of Classification Search
CPC .... C02F 1/003; C02F 9/005; C02F 2302/185; C02F 2307/10
See application file for complete search history.

(56) References Cited

U.S. PATENT DOCUMENTS

| | | | | |
|---|---|---|---|---|
| 6,129,841 | A * | 10/2000 | Dann ...................... | C02F 1/003 210/244 |
| 2011/0303589 | A1* | 12/2011 | Kuennen ................. | C02F 1/003 210/95 |

OTHER PUBLICATIONS

New Millennium Concepts, Ltd.; "Berkey® Water Systems"; located at https://www.berkeywater.com/; Sep. 13, 2018.
New Millennium Concepts, Ltd.; "Big Berkey® System"; located at https://www.berkeywater.com/big-berkey-system-2-25-gal/; Sep. 13, 2018.
SAFE Water Now, Inc.; "Ceramic Water Filter"; located at http://www.safewaternow.org/?page_id=31; Sep. 13, 2018.
Nippon Basic Co., Ltd.; "Cycloclean"; located at http://www.nipponbasic.ecnet.jp/e-cc.html; Sep. 13, 2018.
Gunther, Matthew.; "Drinkable Book Turns Dirty Water Clean for a Thirsty World"; Chemistry World; Chemistry; located at https://www.scientificamerican.com/article/drinkable-book-turns-dirty-water-clean-for-a-thirsty-world/; Aug. 18, 2015.
CMO Council and BPI Network; "Tech Inspirations—Life Sack"; Innovation Zone; located at http://causetech.net/innovation-zone/tech-inspirations/life-sack; Sep. 13, 2018.

(Continued)

*Primary Examiner* — Benjamin M Kurtz
(74) *Attorney, Agent, or Firm* — Thomas E. Lees, LLC

(57) ABSTRACT

The present invention discloses systems and methods for purifying non-potable water. For some embodiments, the system comprises a chemical filter placed at an outlet where potable water exits the system.

8 Claims, 2 Drawing Sheets

(56) References Cited

OTHER PUBLICATIONS

Lifestraw; "One product, one child, one year of clean water"; located at https://www.lifestraw.com/?gclid=EAlalQobChMly7bB84K53QIVQr7; Sep. 13, 2018.

Vestergaard; LifeStraw®; "LifeStraw Personal Water Filter for Hiking, Camping, Travel, and Emergency Preparedness"; located at https://shoplifestraw.com/collections/frontpage/products/lifestraw; Sep. 13, 2018.

Propur; "Introducing Propur Home—Whole House Water Filtration System"; located at https://www.propurusa.com/; Sep. 13, 2018.

Propur; "Propur® Big"; located at https://www.propurusa.com/Propurreg-Big_p_177.html; Sep. 13, 2018.

Proctor & Gamble; "P&G Children's Safe Drinking Water"; located at https://csdw.org/pg-purifier-of-water-packets; Sep. 13, 2018.

Heimbuch, Jaymi; "Filtered Water in 2 Minutes with New UV Light Bottle Invention"; Treehugger; located at https://www.treehugger.com/clean-water/filtered-water-in-2-minutes-with-new-uv-light-bottle-invention.html; Aug. 5, 2010.

Sandru, Ovidiu; "Solarball: Ultra-Cheap Solar-Powered Water Purifier for the Poorest of Us"; The Green Optimistic; located at https://www.greenoptimistic.com/solarball-water-purifier-20110322/#; Mar. 22, 2011.

Zero Technologies, LLC; "Zerowater® 40-Cup Ready-Pour Glass Dispenser with Free Water Quality Meter"; located at http://www.zerowater.com/40c-readypour-glass.php; Sep. 13, 2018.

\* cited by examiner

WATER FILTRATION SYSTEM

BACKGROUND

Field of the Invention

Various aspects of the present invention relate generally to water purification and more specifically to purification of non-potable water.

Description of the Related Art

Before water can be consumed safely, any undesirable chemicals, biological contaminants, suspended solids, or gases in the water must be removed. Commonly, a two-container system is used to purify non-potable water. These containers often comprise stacked containers with a chemical filter affixed between the stacked containers to allow the non-potable water to filter through the chemical filter before collecting in a bottom container.

BRIEF SUMMARY

According to aspects of the present disclosure, systems and methods are provided for purifying non-potable water. For some embodiments, the system comprises a two-container system with a chemical filter placed at an outlet where potable water exits the system.

LEXICON

As used herein, "container" means any device that is capable of holding water.

As used herein, an "upper container" means a container that is capable of being set atop another container.

As used herein, a "lower container" means any container that is capable of being set below another container.

As used herein, a "side wall" means a wall which forms a side of the container.

As used herein, a "removable lid" means any type of cover, which is either completely removable or partially removable (e.g., hinged).

As used herein, "substantially-cylindrical" means for the most part having straight parallel sides and a circular or oval cross-section; or, essentially in the shape of a cylinder.

As used herein, a "bottom" means substantially the lowest point or the lowest surface.

As used herein, a "top" means substantially the highest point.

As used herein, a "bottom center" means a central point of a bottom.

As used herein, a "top center" means a central point of a top.

As used herein, a "coupler" means something that, either directly or indirectly, connects two things together.

As used herein, a "barbed coupler" means a coupler having barbs.

As used herein, an "outlet hole" means an aperture for ejecting water.

As used herein, "affix" means, either directly or indirectly, connect, attach, fasten, put on, join, bind, add to, or any combination thereof.

As used herein, "aligning substantially" means placing or arranging in a substantially straight line.

As used herein, an "adapter" means any device for connecting pieces.

As used herein, "turbidity" means cloudiness or haziness caused by particles.

As used herein, "turbidity filter" means a device which reduces or removes turbidity.

As used herein, a "string filter" means a filter that comprises string wound around a center.

As used herein, a "chemical filter" means a device which removes or reduces chemical impurities.

As used herein, an "activated carbon filter" means a chemical filter which uses activated carbon.

As used herein, a "spigot" means a device which dispenses water when open.

DETAILED DESCRIPTION

Water is an essential nutrient. However, not all water from a water source is safe for human consumption. Before water can be consumed safely, any undesirable chemicals, biological contaminants, suspended solids, or gases in non-potable water must be removed or reduced to safe consumption levels.

The present disclosure provides a device for purifying non-potable water by reducing turbidity in the water and, thereafter, chemically filtering the water as the water is being dispensed.

Figure 1:
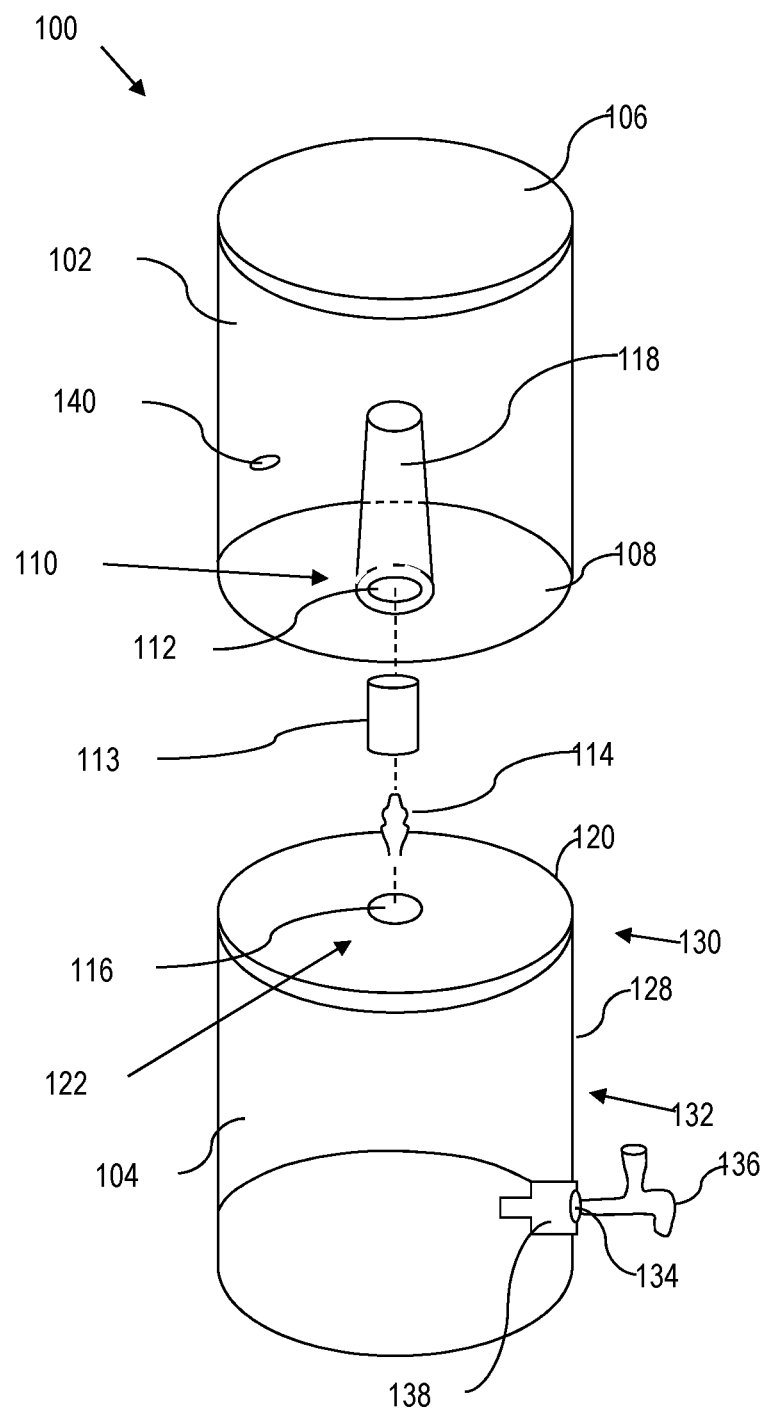
FIG. 1 is a perspective view of a water purification system comprising an upper container and a lower container, according to various aspects of the present disclosure.

Turning now to the figures, FIG. 1 shows an upper container 102 and a lower container 104. In some embodiments, the upper container 102 and the lower container 104 are separate, five (5) gallon buckets, although larger or smaller containers may be used. Both the upper container 102 and the lower container 104 do not require a power source but rather utilize gravity to filter non-potable water. Therefore, very little energy is required to operate the system 100.

The upper container 102 comprises a lid 106. In various embodiments, the lid 106 is a substantially-circular, removable lid or a substantially-circular, semi-removable lid. Preferably, the shape of the lid should correspond with the shape of the upper container 102. The upper container 102 further comprises a bottom 108 with a bottom center 110. In some embodiments, the bottom 108 is substantially circular. The bottom center 110 of the upper container 102 further comprises a bottom coupling hole 112.

An adapter 113 is affixed between the upper container 102 and the lower container 104. The adapter 113 extends through the bottom coupling hole 112 of the upper container 102 and provides a channel for water to flow from the upper container 102 to the lower container 104. In various embodiments, the adapter 113 can be a check valve which controls the rate of water filtration from the upper container 102 into the lower container 104. Preferably, the adapter 113 is a hollow device which allows water to openly filter into the lower container 104.

In some embodiments, the adapter 113 comprises a barbed coupler 114. Specifically, the barbed coupler 114 is affixed through the adapter 113. The barbed coupler 114 protrudes through a top coupling hole 116 of the lower container 104. Furthermore, a turbidity filter 118 is affixed over the barbed coupler 114. Affixing the turbidity filter 118 over the barbed coupler 114 provides a mechanical coupling of the turbidity filter 118 to the bottom container 104 via the adapter 113. For some embodiments, the turbidity filter 118 is coupled directly to the adapter 113, thereby removing the need for a separate barbed coupler 114.

In various embodiments, the turbidity filter 118 is a one (1) micrometer (μm) string filter. Alternatively, the turbidity filter 118 can be a microporous filter affixed over the barbed coupler 114. In various embodiments, the upper container 102 and the lower container 104 are coaxial, aligning the bottom coupling hole 112 of the upper container 102 with the top coupling hole 116 of the lower container 104.

The lower container 104 comprises a lid 120 at the top of the lower container 104. In various embodiments, the lid 120 is a substantially-circular, removable lid or a substantially-circular, semi-removable lid. Preferably, the shape of the lid 120 corresponds with the shape of the lower container 104. The lid 120 of the lower container 104 further comprises a top center 122 with a top coupling hole 116. The top coupling hole 116 of the lower container 104 is aligned with the bottom coupling hole 112 of the upper container 102. Aligning the bottom coupling hole 112 of the upper container 102 and the top coupling hole 116 of the lower container 104 provides a mechanical coupling of the lower container 104 to the upper container 102 via the barbed coupler 114.

The lower container 104 comprises a side wall 128 separating an inside of the lower container 104 from an outside of the lower container 104. In various embodiments, the side wall 128 is substantially-cylindrical. The side wall 128 further comprises an upper section 130 and a lower section 132. An outlet hole 134 is located in the lower section 132 of the lower container 104 to permit dispensing of water from the lower container 104. Furthermore, a spigot 136 is externally affixed to the lower container 104 and covering the outlet hole 134.

A chemical filter 138 is affixed internally to the lower container 104 at the outlet hole 134, thus allowing for chemical filtration at the point of dispensation. In various embodiments, the chemical filter 138 is an activated carbon filter.

For example, if chlorine is added to kill biological contaminants (e.g., E. Coli) from non-potable water, then activated carbon is used to remove the chlorine from the water. In some embodiments, chlorine is introduced in the form of a sixty-seven (67) milligram (mg) chlorine tablet. The composition of the chemical filter will depend on the chemical added to the water. In yet another embodiment, the chemical filter 138 is a three (3) inch, activated carbon filter, which is shorter than conventional five (5) inch filters. A shorter chemical filter provides several advantages over existing technology. For example, a shorter chemical filter 138 equalizes the life span of the chemical filter 138 and the turbidity filter 118. It should be appreciated that the life span of the chemical filter 138 and the life span of the turbidity filter 118 can be equalized based on the concentrations of chemicals and degree of turbidity. Insofar as those having skill in the art are able to calculate the approximate life spans of these respective filters, further discussions of the life spans are omitted herein.

In some embodiments, the spigot 136 and the chemical filter 138 are affixed on opposing ends of a channel, the channel being between the inside of the lower container 104 and the outside of the lower container 104. In other embodiments, the chemical filter 138 resides within the spigot 136. The chemical filter 138 located at the outlet hole 134 simplifies the system 100 by reducing the amount of chemicals needed to kill pathogens and reducing the required number of parts, thereby reducing costs. In other words, unlike conventional systems, which have a chemical filter that resides between the two buckets, the disclosed embodiments employ principles of operation that cannot be accomplished by conventional two (2) bucket systems.

The disclosed embodiments allow non-potable water to be filtered for turbidity as it flows into the lower container 104. The turbidity reduced water then sits for a predetermined period of time to allow the chemical solute 140 to remove any undesirable biological contaminants within the turbidity-reduced water.

The disclosed system 100 also provides a built-in timer for the user. For example, it takes approximately thirty (30) minutes for chlorine to kill unwanted biological contaminants (e.g. E. Coli) from non-potable water. Correspondingly, it takes approximately thirty (30) minutes (if not longer) for the non-potable water to be collected in the lower container 104. In this water purification system 100, once substantially all of the water has moved from the upper container 102 to the lower container 104, the user can be fairly confident that the turbidity-reduced water has had sufficient exposure to the chlorine and, thus, is ready for human consumption. Therefore, the disclosed water purification system 100 reduces the risk of dispensing water too early.

Figure 2:
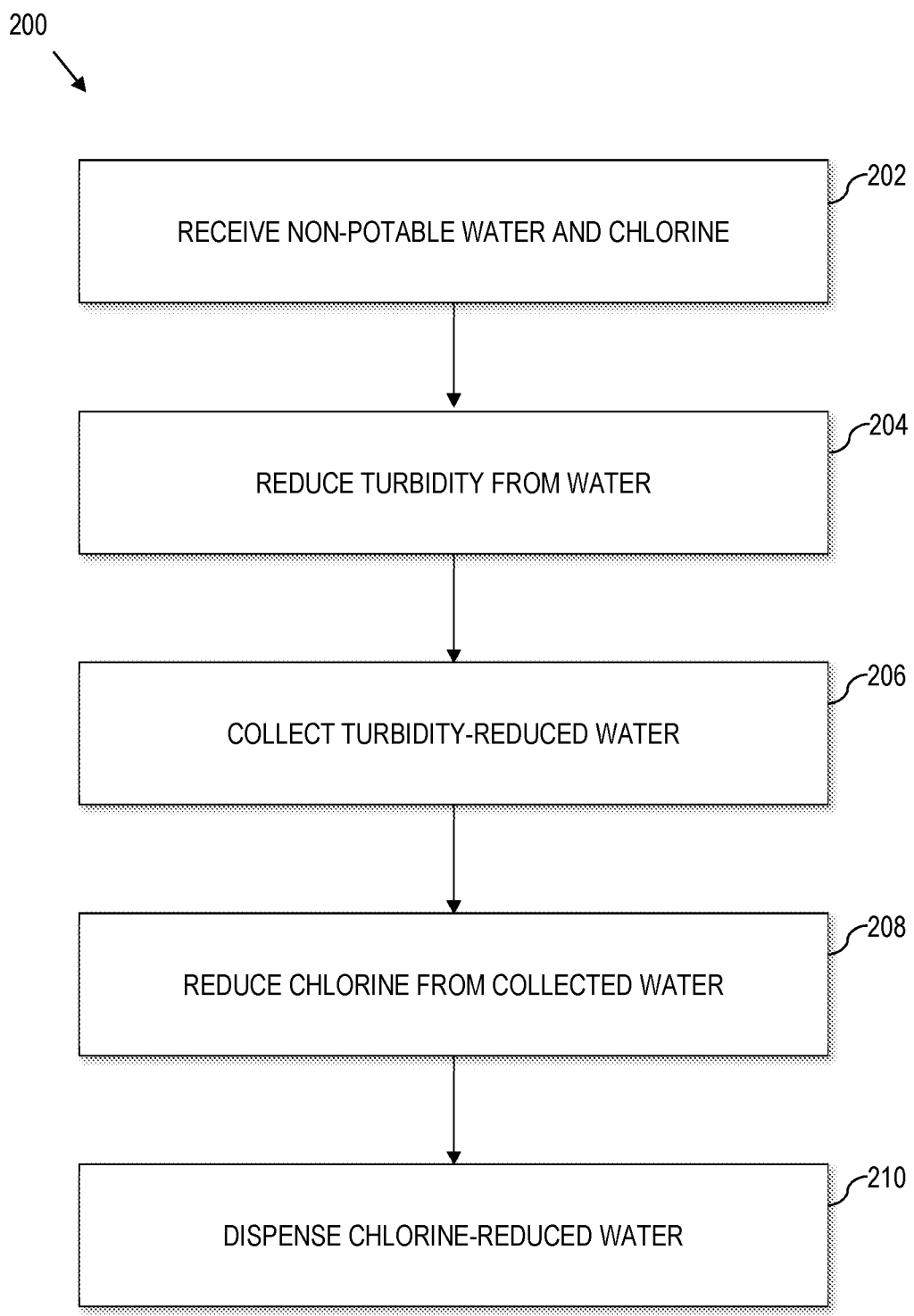
FIG. 2 is a flow chart illustrating a process for purifying non-potable water, according to various aspects of the present disclosure.

Turning now to FIG. 2, a process 200 for non-potable water purification is shown. At 202, non-potable water is received by an upper container and chlorine is added to the non-potable water in the upper container. Alternatively, the chlorine can be added to the non-potable water prior to receiving the non-potable water by the upper container. In various embodiments, the chlorine is introduced as a sixty-seven (67) milligram chlorine tablet, although a lower or higher chlorine concentration can be used. The chlorine is combined with non-potable water to kill biological contaminants (e.g., E. Coli) that are small enough to pass through pores of a turbidity filter.

At 204, the non-potable water filters through the turbidity filter removing larger particles within the non-potable water. When the non-potable water is filtered through the turbidity filter, turbidity-reduced water is collected in a lower container at 206. The water collected in the lower container still contains the chlorine, as chlorine molecules are small enough to pass through pores of the turbidity filter. Therefore, the chlorine molecules are collected along with the turbidity-reduced water in the lower container. Prior to dispensing the turbidity-reduced water, the turbidity-reduced water passes through a chemical filter to reduce the chlorine at 208. Substantially simultaneously as a user dispenses the water for consumption the water is filtered through the chemical filter. Thus, at 210, the dispensed water is safe for human consumption.

Affixing the chemical filter in the lower portion of the lower container reduces water filtration time by increasing a flow rate of non-potable water from the upper container into the lower container.

In conventional two-container systems, stacked containers comprise a chemical filter affixed between the containers to allow non-potable water to filter through the chemical filter before collecting in a lower container. To filter, a user must fill a container and lift that filled container to stack it atop another container. Unlike those conventional systems, in this water purification system 100 the upper container is placed atop the lower container prior to the introduction of non-potable water, thereby eliminating the need to lift a heavy water-filled container and align it with a bottom container. Consequently, in addition to various other advantages, the disclosed system reduces spillage of water that occurs in conventional two-bucket systems.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A system, comprising:
    a five (5) gallon upper bucket, comprising:
        a substantially circular removable lid for covering the upper bucket;
        a substantially circular bottom with a bottom center;
        a bottom coupling hole located substantially at the bottom center;
        an adapter for affixing through the bottom coupling hole, the adapter comprising a barbed coupler; and
        a one (1) micrometer (μm) string filter for affixing to the adapter; and
    a five (5) gallon lower bucket for mechanically coupling to the upper bucket, the lower bucket comprising:
        a substantially circular removable top with a top center, the top center for aligning substantially with the bottom center;
        a top coupling hole located substantially at the top center, the top coupling hole for affixing the barbed coupler therein;
        a substantially cylindrical side wall separating an inside of the lower bucket from an outside of the lower bucket, the substantially cylindrical side wall comprising:
            an upper section; and
            a lower section;
        an outlet hole in the lower section, the outlet hole forming a channel between the inside of the lower bucket and the outside of the lower bucket; and
        an activated carbon filter for affixing to the inside of the lower bucket at the outlet hole; and
    a spigot for affixing to outside of the lower bucket at the outlet hole.

2. A system comprising:
    an upper container, comprising:
        a bottom;
        a bottom coupling hole located in the bottom;
        an adapter for affixing through the bottom coupling hole; and
        a turbidity filter for operatively coupling to the adapter; and
    a lower container for mechanically coupling to the upper container, the lower container comprising:
        a top;
        a top coupling hole located in the top, the adapter operatively coupled to the top coupling hole;
        a side wall separating an inside of the lower container from an outside of the lower container, the side wall comprising:
            an upper section; and
            a lower section;
        an outlet hole in the lower section, the outlet hole forming a channel between the inside of the lower container and the outside of the lower container; and
        a chemical filter for affixing to the inside of the lower container at the outlet hole; and
    a spigot for affixing to the outside of the lower container at the outlet hole.

3. The system of claim 2, wherein the upper container is a five (5) gallon bucket.

4. The system of claim 2, wherein the turbidity filter is a microporous filter.

5. The system of claim 4, wherein the microporous filter is a one (1) micrometer (μm) string filter.

6. The system of claim 2, where the adapter comprises a barbed coupler.

7. The system of claim 2, wherein the lower container is a five (5) gallon bucket.

8. The system of claim 2, wherein the chemical filter is an activated carbon filter.

* * * * *